United States Patent Office 3,461,087
Patented Aug. 12, 1969

3,461,087
METHOD OF MAKING A FOAMABLE POLYMER AND FOAMABLE COMPOSITION OBTAINED THEREFROM
James E. Pritchard, Bartlesville, Okla., assignor to Phillips Petroleum Company, a corporation of Delaware
No Drawing. Filed Dec. 15, 1965, Ser. No. 514,142
Int. Cl. C08d *13/10;* C08f *47/10*
U.S. Cl. 260—2.5                    8 Claims

ABSTRACT OF THE DISCLOSURE

A more uniformly foamed polymer is obtained when the temperature control agent is first mixed with the polymer, thereafter the dispersing agent is added to the mixture of control agent and polymer, and finally the foaming agent is added.

This invention relates to a method for making a highly uniform foamable polymer composition and a method for making a more uniformly foamed polymer composition. This invention also relates to a more uniformly foamed polymer composition.

Heretofore polymers have been foamed by incorporating a foaming agent therein and activating the foaming agent by heating or other suitable means. However, in many instances the foaming agent is not activated, i.e., decomposed, at the temperature at which the viscosity of the polymer is optimum for the production of uniform gas cells and in such cases a temperature control agent, i.e., an agent which is substantially inert to the polymer and which either lowers (promoter) or raises (retarder) the temperature at which the foaming agent is activated, is used. In order to obtain a uniformly foamed product the foaming agent and temperature control agent must be uniformly dispersed in the polymer which is conventionally done by mixing the materials together. However, problems have been encountered in that an adequate dispersion of the agents in the polymer has not been readily obtainable and therefore a nonuniformly foamed product results. To aid in the dispersion of these agents in the polymer, dispersion agents have been employed while the foaming agent and temperature control agent are mixed with the polymer. It has been found though that even when dispersion agents are employed uniformity of foaming was still not readily obtained and products were often obtained which contained cross sections having an unduly large number of and/or unduly large gas cells while other cross sections contained substantially no gas cells at all. Also, when the cross section of these products was sufficiently small the gas cells were often large enough to completely fracture or cut the product in two.

Quite surprisingly, it has now been found that reproducible, uniformly foamed polymer products can be obtained when the temperature control agent is first mixed with the polymer by itself, the dispersing agent is then added by itself and mixed with the temperature control agent and polymer composition, and the foaming agent is then added last and mixed with the combination of temperature control agent, dispersing agent, and polymer. Although not known to a certainty and therefore not desiring to be bound thereby, it presently appears that the reproducibly more uniformly foamed product of this invention relates at least in part to the fact that the temperature control agent is prevented from direct contact with the foaming agent in bulk or large quantities and that the dispersing agent is itself dispersed on and in the polymer before the foaming agent is added.

Also according to this invention, a foamed polyolefin composition of reproducible and of a more uniformly foamed nature is prepared by foaming the product of the mixing method set forth in the preceding paragraph.

Accordingly, it is an object of this invention to provide a new and improved method for making a more uniformly foamable polymer composition. It is another object of this invention to provide a new and improved method for making a more uniformly foamed polymer. It is another object of this invention to provide a more uniformly foamed polymer.

Other aspects, objects, and the several advantages of this invention will be apparent to those skilled in the art from the description and appended claims.

According to this invention the temperature control agent is incorporated into the polymer by any conventional mixing method including the use of roll mills, Banbury mixers, Brabender mixers, compounding extruders, pelletizing extruders, and the like, followed by pelletizing or grinding if this is not a part of the mixing operation. The dispersing agent and foaming agent are then added in successive dry-blending steps. The temperature control agent can be incorporated in the polymer when the polymer is in the molten or solid form. Dry mixing of the dispersing and foaming agents can be carried out at room or ambient temperatures. Ambient pressures and atmospheres can also be employed although sub- or superatmospheric pressures as well as inert atmospheres can be used if desired. The time of mixing to cause dispersion of each agent can vary widely, e.g., from a few minutes to several hours; however, from about 3 to about 60 minutes for each agent is generally satisfactory.

This invention is applicable to substantially any foamable polymer be it a homopolymer or copolymer of two or more monomers or mixtures thereof. Preferred polymers are polyolefins which include homopolymers and copolymers, such as high and low density polyethylene, polypropylene, ethylene/butene-1 copolymers, and the like. Generally, 1-olefins containing from 2 to 8 carbon atoms per molecule, inclusive, can be employed to make polyolefins. Other polymers that can be used include rubbery polymers formed from one or more conjugated dienes as well as rubbery or crystalline copolymers of 1-olefins and dienes.

Substantially any foaming agents known in the art can be employed. Generally, the foaming agents used are those which liberate a gaseous material at a temperature in the range of from about 300 to about 700° F. Suitable foaming agents include N,N'-dinitrosopentamethylenetetramine, sodium bicarbonate, azodicarbonamide, 4,4'-oxy-bis-(benzenesulfonyl hydrazide), azobisisobutyronitrile, benzene-1,3-disulfonylhydrazide, diazoaminobenzene, barium azodicarboxylate, and the like. The amount of foaming agent employed can vary widely depending upon the polymer used and other conditions but will generally be in the range of from about 0.1 to about 5, preferably about 0.2 to about 2, parts based on 100 parts by weight of the polymer.

Any conventional temperature control agent can also be employed. Such agents include zinc oxide, barium stearate, calcium stearate, magnesium oxide, aluminum stearate (mono- or di-), aluminum laurate, barium ricinoleate, tin methoxy maleate, lead acetate, zinc laurate, cadmium amyl phosphide, aluminum palmitate, magnesium behenate, and the like. Generally, metal salts of fatty acids can be used, zinc, calcium, barium, aluminum, and magnesium being preferred metals and the fatty acid moiety preferably containing from 2 to 22 carbon atoms. The amount of this agent employed can also vary widely but will generally be from about 0.1 to about 10, preferably about 0.2 to about 5, parts per part of foaming agent.

Generally, any known dispersing agent can be employed which is substantially inert to the other agents and polymer and which effectively tends to distribute the foaming agent throughout the whole of the polymer. Suitable dispersants include mineral oil, dioctylphthalate, liquid polyisobutylene, and the like. The mineral oil used can be paraffinic, naphthenic, or aromatic petroleum oil and can be a normally liquid product having a viscosity of from about 200 to about 600 S.U.S. at 100° F. (ASTM D87–57). The liquid polyisobutylene can have a molecular weight in the range of from about 500 to about 5,000, preferably from about 1,000 to about 3,000. The dispersant can also be employed in widely varying amounts but from about 0.01 to about 1, preferably from about 0.05 to about 0.5, part of dispersant per 100 parts of polymer can generally be employed.

Of course, mixtures of two or more polymers, foaming agents, temperature control agents, and dispersing agents can be used.

Also various conventional additives such as antioxidants or other stabilizers, antistatic agents, vulcanizing agents, pigments, and the like can be employed. If the foamed product is vulcanized, vulcanization can accompany or follow foaming.

This invention can be used in the making of any foamed polymer product but is particularly amenable to making foamed fibers or other products of relatively small cross section such as binder twine because due to the extremely uniform dispersion of the agents and therefore the uniform foaming of the polymer, no risk is run of the segregation of foaming agent in the fiber and the consequent weakening or severing of the fiber upon foaming.

EXAMPLE

Foamed filaments were prepared from polypropylene having a density of 0.90 (ASTM D1505–63T) and a melt flow of 3 (ASTM D1238–62T, condition L) using the following recipe:

| | Parts by wt. |
|---|---|
| Polymer | 100 |
| Calcium stearate | 0.2 |
| Dioctylphthalate | 0.1 |
| Azodicarbonamide | 0.2 |

Three blends were formed employing three different mixing techniques.

*Blend 1.*—The polymer was compounded with a calcium stearate temperature control agent for 2 to 3 minutes at room temperature in a pelletizing extruder. The resulting pellets were then dry blended with the dioctylphthalate dispersing agent by tumbling at room temperature for 10 minutes. Thereafter this mixture was dry blended with the azodicarbonamide foaming agent by tumbling at room temperature for 5 to 10 minutes.

*Blend 2.*—The polymer was blended with the dioctylphthalate by tumbling at room temperature for 10 minutes, and the resulting mixture was then dry blended with the calcium stearate and azodicarbonamide added at substantially the same time, by tumbling at room temperature for 10 minutes.

*Blend 3.*—All three of the agents were added to the polymer substantially at the same time and all ingredients were mixed on a roll mill for 20 minutes.

Foamed filaments were prepared from each of the blends by extrusion of the blend from a 1.5-inch extruder using a die temperature of 425° F. and a draw ratio of 11 to 1. The die had 10 holes, each 0.042 inch in diameter, and the filaments were quenched in a water bath 2 inches from the die face.

The foamed filament formed from blend 1 (the invention) had a uniform cell structure throughout its interior which cell structure was composed of uniformly small diameter gas cells. Foamed filament formed from both blends 2 and 3 was fractured and even cut in two in many places and those portions which were not fractured exhibited nonuniform and incomplete foaming in that some areas contained substantially no gas cells while other areas contained large numbers of gas cells of greatly varying size. Thus, it can be seen that by the order of mixing of the agents according to this invention a substantially more uniform foamed product is obtained.

Reasonable variations and modifications are possible within the scope of this disclosure without departing from the spirit and scope thereof.

I claim:

1. A method for making a more uniformly foamable polymer composition comprising mixing at least one temperature control agent selected from the group consisting of zinc oxide, magnesium oxide, cadmium amyl phosphide and a metal salt of a fatty acid wherein the fatty acid moiety contains from 2 to 22 carbon atoms with at least one polymer selected from the group consisting of homopolymers of 1-olefins, copolymers of 1-olefins consisting predominantly of 1-olefin, rubbery polymers of at least one conjugated diene, and copolymers of 1-olefins and dienes to form a first mixture, mixing at least one dispersing agent selected from the group consisting of mineral oil, dioctylphthalate, and liquid polyisobutylene with the said first mixture to form a second mixture, and mixing at least one foaming agent which liberates a gaseous material at a temperature of from about 300 to about 700° F. with said second mixture to form the foamable composition.

2. The method according to claim 1 wherein said foamable composition is foamed by extruding said composition at a temperature within the range of 300–700° F.

3. The method according to claim 1 wherein said polymer is a polyolefin, the foaming agent is selected from the group consisting of N,N'-dinitrosopentamethylenetetramine, sodium bicarbonate, azodicarbonamide, 4,4'-oxy-bis-(benzenesulfonyl hydrazide), azobisisobutyronitrile, benzene-1,3-disulfonylhydrazide, diazoaminobenzene, barium azodicarboxylate, the temperature control agent is one of zinc oxide and calcium stearate, the dispersing agent is at least one selected from the group consisting of mineral oil having a viscosity of from about 200 to about 600 S.U.S. at 100° F., dioctylphthalate, and liquid polyisobutylene having a molecular weight in the range of from about 500 to about 5000 and the time of mixing of each of the temperature control agents with the polymer, the dispersing agent with the polymer and temperature control agent, and the foaming agent with the polymer, temperature control agent, and dispersing agent, is from about 3 to about 60 minutes.

4. The method according to claim 3 wherein the foaming agent is employed in the amount of from about 0.1 to about 5 parts per 100 parts by weight of polymer, the temperature control agent is employed in the amount of about 0.1 to about 10 parts per part by weight of foaming agent, and the dispersing agent is employed in the amount of from about 0.01 to about 1 part per 100 parts by weight of polymer.

5. The method according to claim 1 wherein the polymer is at least one of polyethylene and polypropylene, the foaming agent is azodicarbonamide, the temperature control agent is one of zinc oxide and metal salts of stearic acid wherein the metal is selected from the group consisting of zinc, calcium, barium, aluminum, and magnesium and the dispersing agent is liquid polyisobutylene.

6. The method according to claim 5 wherein the metal salt is calcium stearate, and the polymer is one of polyethylene and polypropylene.

7. A foamable polymer composition wherein the foamable composition is prepared according to the method of claim 1.

8. The composition according to claim 7 wherein the polymer is a polyolefin, the dispersing agent is liquid polyisobutylene, and the control agent is zinc oxide.

References Cited

UNITED STATES PATENTS

| | | | |
|---|---|---|---|
| 3,197,423 | 7/1965 | Ackerman | 260—2.5 |
| 3,278,466 | 10/1966 | Cram et al. | 260—2.5 |
| 3,305,496 | 2/1967 | Riley et al. | 260—2.5 |

MURRAY TILLMAN, Primary Examiner

MORTON FOELAK, Assistant Examiner

U.S. Cl. X.R.

260—23, 31, 33